June 10, 1958     B. R. ANDRUS     2,837,877
GRINDERS FOR GRINDING CUTTER BLADES
Filed Feb. 13, 1956     2 Sheets-Sheet 1
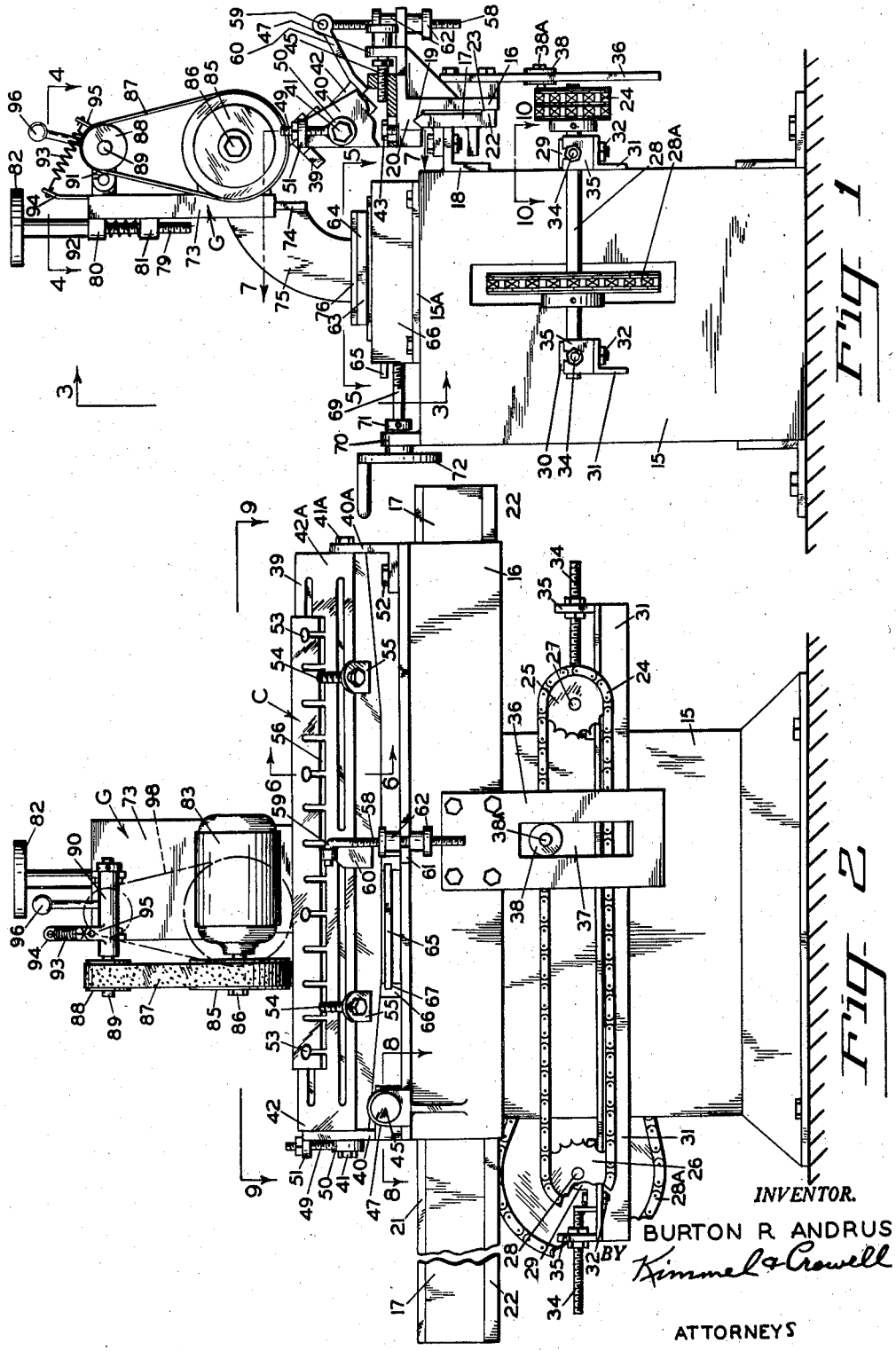
INVENTOR.
BURTON R. ANDRUS
BY Kimmel & Crowell
ATTORNEYS June 10, 1958  B. R. ANDRUS  2,837,877
GRINDERS FOR GRINDING CUTTER BLADES
Filed Feb. 13, 1956  2 Sheets-Sheet 2
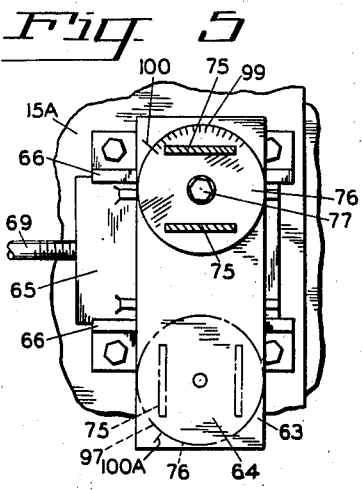
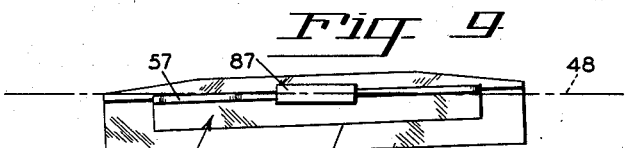
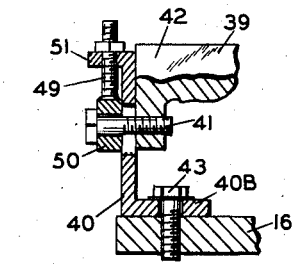
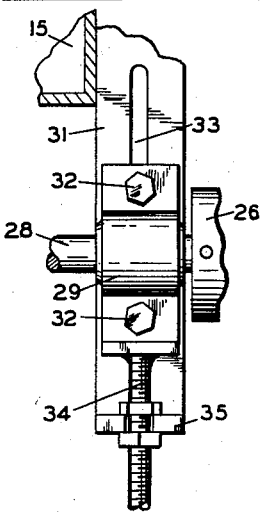
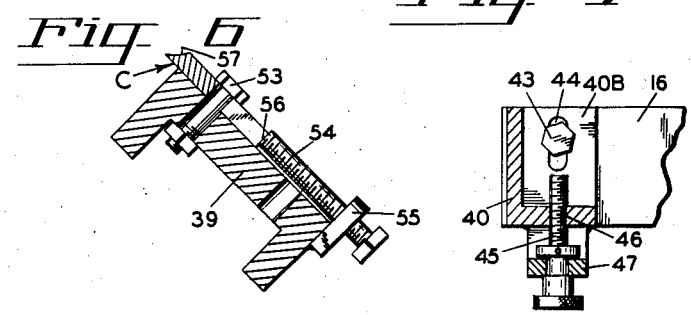
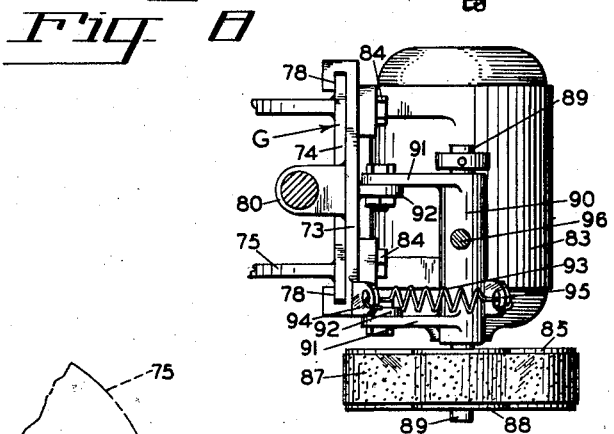
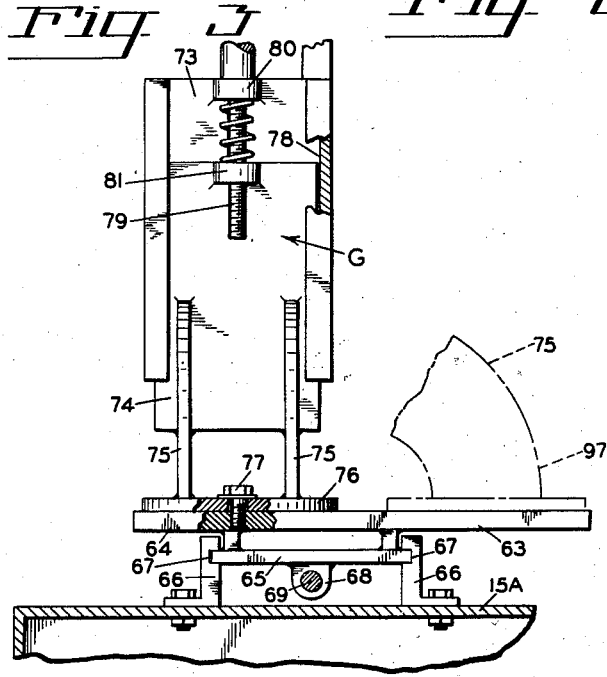
INVENTOR.
BURTON R. ANDRUS
BY
*Kimmel & Crowell*
ATTORNEYS United States Patent Office 2,837,877
Patented June 10, 1958

2,837,877

GRINDERS FOR GRINDING CUTTER BLADES

Burton R. Andrus, Eugene, Oreg.

Application February 13, 1956, Serial No. 564,982

4 Claims. (Cl. 51—143)

This invention relates to improvements in grinders for grinding cutter blades, and it is particularly adapted to the grinding of blades used in jointers, planers, chipping machines and the like.

The primary object of the invention is to employ an endless grinding belt for sharpening cutter blades and the like.

A further object of this invention is to mount the grinding head upon a machine consisting of a base frame having a moving carriage associated therewith for moving the blade to be sharpened relative to the grinding head.

Another object of the invention is to provide means of adjusting the grinding belt to grind the blade to form either a flat or hollow ground cutting edge by adjusting the grinding head about a vertical axis in relation to the blade being ground.

A still further object of this invention is to so mount the grinding head so as to employ the entire width of the grinding belt while grinding the blade.

A further object of this invention is to provide means within the grinder head for maintaining a predetermined tension on the grinding belt.

Other objects and advantages will become apparent in the following specification when considered in the light of the attached drawings, in which:

Figure 1 is an end elevation of the machine constructed according to the invention.

Figure 2 is a front elevation of the machine shown in Figure 1.

Figure 3 is an enlarged fragmentary sectional view of the grinding head mechanism, taken on the line 3—3 of Figure 1, looking in the direction of the arrows.

Figure 4 is an enlarged fragmentary sectional view of the grinding head assembly, taken on the line 4—4 of Figure 1, looking in the direction of the arrows.

Figure 5 is a fragmentary sectional view of the base of the grinding mechanism, taken on the line 5—5 of Figure 1, looking in the direction of the arrows.

Figure 6 is an enlarged fragmentary sectional view illustrating how the blade is mounted to the blade holding base associated with the machine, taken on the line 6—6 of Figure 2, looking in the direction of the arrows.

Figure 7 is an enlarged fragmentary sectional view, taken on the line 7—7 of Figure 1, looking in the direction of the arrows.

Figure 8 is an enlarged fragmentary sectional view of the mechanism for adjusting the angle of the base and blade passing under the grinder, taken on the line 8—8 of Figure 2, looking in the direction of the arrows.

Figure 9 is a diagrammatical view of the blade and its holding base, illustrating how the longitudinal axis of the blade and base is offset in regards to the direction of travel of the base under the grinding unit.

Figure 10 is an enlarged fragmentary sectional view of a bearing mounting, taken on the line 10—10 of Figure 1, looking in the direction of the arrows.

Referring now to the drawings in detail wherein like reference numerals indicate like parts throughout the several figures, the reference numeral 15 indicates a base frame on which the remainder of the construction is mounted. A movable carriage 16 is slidably mounted to a rail 17 fixedly secured to the frame 15 by a bracket 18, as best illustrated in Figure 1. The carriage 16 may be slidably mounted on the rail 17 by a V-shaped groove 19 formed under a ledge 20 on the carriage 16, the groove 19 riding on a V-shaped tongue 21 formed on an upper edge of the rail 17. The lower edge 22 of the rail 17 being adapted to engage a surface 23 of the carriage 16 for maintaining the carriage 16 in alignment with the rail 17. The carriage 16 is moved longitudinally of the base frame 15 by an endless chain 24.

The chain 24 is trained about sprockets 25 and 26. These sprockets 25 and 26 are keyed to cross shafts 27 and 28. These shafts 27 and 28 are journalled within adjustable bearings 29 and 30, referring particularly to Figures 1 and 10. These bearings 29 and 30 are mounted upon brackets 31 by bolts 32 which pass through slots 33. The position of the bearings 29 and 30 is further determined by threaded rods 34 which form part of the bearing base and extend through upturned ends 35 of the brackets 31. The purpose of this adjustment will be described later on.

An arm 36 extends downwardly from the carriage 16 and adjacent the chain 24, as best illustrated in Figures 1 and 2. The arm 36 has a slot 37 formed therein which is adapted to receive the roller 38 which is fixedly secured to the chain 24 by stub shaft 38A. As the chain 24 is rotated about its sprockets 25 and 26 the roller 38 is carried therewith and moves the arm 36, together with the carriage 16, longitudinally of the base 15 and the rail 17. The chain 24 is driven by the shaft 28, which in turn is driven by the chain 28A from a motor (not shown) within the base 15.

A cutter blade C holding or supporting base 39 is pivotally mounted longitudinally of the carriage 16 in the following manner. Upwardly extending legs or brackets 40 and 40A are adapted to receive stud bolts 41 and 41A, which are threaded into ends 42 and 42A of the base 39, as best illustrated in Figures 1, 2, 7 and 8. The upwardly extending legs 40 is adapted to be adjusted transversely of the carriage 16, referring particularly to Figures 7 and 8, the base 40B of the leg 40 is bolted to the carriage 16 by the bolts 43 by slots 44 in the base 40B.

An adjusting hand screw 45 is threaded into the base 40B of the leg 40 at 46, and is rotatably journalled within a bracket 47 forming part of the carriage 16. This provides an accurate and fine adjustment of the blade holding base 39 transversely of the carriage 16.

Referring to Figure 9, the center line of the carriage 16 is indicated by numeral 48. From this center line 48 it can be seen how the blade base 39 is shifted off its center line of travel. The object of this adjustment is to position the cutter blade C being ground so as to shift its position under a grinding belt 87 in the operation of the grinder G.

The elevation of end 42 is also adjustable so as to permit leveling of the base 39 and the cutter blade C under the grinding belt 87. This is accomplished by adjusting bolt 49 which has an eye 50 formed thereon adapted to pass around the stud bolt 41. The adjusting bolt 49 passes through a bracket 51 forming the upper part of the leg 40, referring particularly to Figure 7, so that the end 42 of the base 39 can be raised or lowered after which the cap screw 41 is locked, holding the same in this adjusted position, completing the vertical adjustment of the base 39 as desired.

The hold down cap screw 43 locks the leg 40 tightly down against the carriage 16 after the transverse adjustment has been made with the screw 45. The cap screw 52 locks the leg 40A against the carriage 16 following the transverse adjustment of the leg 40A.

The cutter blade C being sharpened or conditioned is bolted to the base 39 by the bolts 53. Adjusting set screws 54 are threaded through the arms 55 forming part of the base 39 and are adapted to engage the edge 56 of the cutter blade C, as best illustrated in Figure 6. This provides a fine accurate adjustment of the blade C.

Before the setting up of the cap screws 41 and 41A, the angle of the cutting edge 57 of the blade C is determined by the adjustment of the base 39 about the cap screws 41 and 41A by way of the adjusting rod 58, whose one end is pivotally mounted at 59 to the arm 60 forming part of the base 39, and secured to the ears 61 forming part of the carriage 16 by the adjusting rods 62. When this adjustment has been completed the cap screws 41 and 41A are tightened.

Referring to Figures 1, 3 and 4, the grinding head unit G will now be described. This unit consists of a base 63 mounted upon the top 15A of the frame 15 of the machine. The base 63 consists of a table 64, which in turn has a base plate 65 forming part thereof. The base plate 65 is supported upon the legs 66 operating within the grooves 67, as best illustrated in Figure 3.

Extending downwardly from the base 65 is a threaded boss 68 into which is threaded the adjusting screw 69, referring to Figure 1. This screw 69 passes through a bracket 70 forming part of the frame 15 and is secured thereto by the collar 71 and the crank 72. The crank 72 is adapted to rotate the screw 69, thereby moving the base 65 away and towards the carriage 16.

A vertical base plate 73 is slidably mounted to a base plate 74. The base plate 74 is supported by a gooseneck pedestal 75. The gooseneck pedestal 75 has a base 76 which is supported by the base 63 by cap screws 77, referring particularly to Figures 3 and 5.

The vertical movable base 73 is slidably mounted to the base 74 on guideways 78, referring particularly to Figure 4, and its vertical elevation is determined by a screw 79 which is journalled within the bracket 80 forming part of the base 73. This screw 79 is threaded into the bracket 81 forming part of the base plate 74, referring particularly to Figure 3. By rotating a hand wheel 82, forming part of the screw 79, the base 73 can be raised or lowered.

A motor 83 is fixedly secured to the base 73 by bolts 84, referring to Figure 4. A driving belt pulley 85 is keyed to the shaft 86 of the motor 83 and is adapted to drive a grinding belt 87. The belt 87 is also trained about an idler pulley 88. The idler pulley 88 is fixedly mounted to a shaft 89, which in turn is journalled within a bearing support 90. The bearing support 90 is pivotally connected to the base 73 by arms 91, which are pivotally connected to the bracket 92, as best illustrated in Figures 1, 2 and 4.

Referring to Figure 1, the bearing 90 is held in a raised position by the spring 93, which has one of its ends secured to the arm 94 and its opposite end to the arm 95 forming part of the bearing 90. This places a constant tension on the grinding belt 87. A handle 96 is fixedly secured to the bearing 90 and is adapted to pull the bearing down against the spring 93 when removing and replacing the belt 87.

In the drawings, the grinding head unit G is shown in position for hollow grinding the blade C as indicated at 57, Figure 6. When the grinder G is being used for grinding a flat cutting edge to the blade C, the base 76 is moved to the broken line position, as indicated in Figures 3 and 5, causing the plane of the pulley 85 to take a position parallel to the movement to the length of the blade C and carriage 16.

In order to centralize the position of the grinding belt 87 midway the travel of the blade C being ground, the base 63 is of sufficient length to allow the resetting of the grinding head G, as indicated by the broken lines 97 in the above figures.

There is still another way of centering the grinding unit G to the movement of the cutter blade C by adjusting the bearings 29 and 30 on the brackets 31 shifting the position of the chain 24 to either one side or the other of the grinding machine in general.

While I have shown the grinding head G arranged at 90 degrees to the blade C being hollow ground, I find best results are obtained when set at about a 60 degree angle from the blade C, although I would not wish to be limited to any particular angle of operation.

I will now describe the operation of this new and improved blade grinding machine. The blade C to be conditioned is bolted to the base 39 by the bolts 53. The set screws 54 are adjusted to align the blade C in regards to the base 39, thereby providing a fine adjustment in positioning the blade C relative to the base 39. The cap screws 41 and 41A are loosened together with the cap screws 43 and 52. At this point the angle of the base 39 and blade C in regards to the face of the grinding belt 87 is determined by the adjusting rod 58, which is adjusted by the adjusting nut 62 positioning the blade C at the proper angle for the bevel to be created on the cutting edge 57 of the blade. The center line of the face of the cutting blade C is then aligned to the desired angle of the center line 48, referring to Figure 9, by the hand screw 45, referring to Figures 1, 2 and 8.

The blade C is then leveled so that it will contact the grinding belt 87 throughout the entire travel of the cutting blade C and carriage 16 by the adjusting bolt 49, referring to Figure 7 particularly. All of these adjustments can be made more or less alternately with one another until the proper adjustment has been arrived at. After these adjustments are completed, the cap screws 41, 41A, 43 and 52 are tightened, clamping the whole assembly together.

The next setting will be the grinding head G itself, and this is accomplished by adjusting the base 76 about the cap screw 77, observing the gauge marks 99 to determine the angle at which the sanding belt 87 is to operate in regards to the cutting edge 57 of the blade C as above described, then by adjusting the hand wheel 82, the grinding belt 87 can be brought down against the cutting edge 57 of the blade C to where it will begin to grind the same.

The chain 24 will move the carriage 16 back and forth of the machine bringing the full length of the blade C in contact with the grinding belt G, the grinding operation taking place until the entire length of the blade C has been ground to the desired shape.

With this grinding machine the belt 87 can be eliminated, together with the pulley 85 and a grinding wheel (not shown) attached to the shaft 86 of the motor, but many advantages have been found in using a grinding belt 87 instead of a wheel in conditioning the cutter blades C.

Having thus described the preferred embodiment of the invention, it should be understood that numerous modifications and structural adaptations may be resorted to without departing from the scope of the appended claims.

What is claimed is:

1. A cutting blade grinding machine comprising an elongated base, a pair of spaced apart parallel legs secured to said base and extending transversely thereof, said legs having horizontal grooves formed in the adjacent sides thereof, a base plate having the opposite side edges supported in said grooves for transverse horizontal sliding movement, hand control means on said base for sliding said base plate horizontally with respect to said base, a longitudinally extending table fixed to said base plate in upwardly spaced parallel relation thereto, a goose-neck pedestal, a vertical pivot bolt securing said pedestal to said table for rotary adjustment thereon, an upright plate on said goose-neck extending perpendicularly to said table, a vertical base plate mounted for vertical sliding movement on said upright plate, control means extending between said vertical base plate and said upright plate for sliding said vertical base plate with respect to said upright plate, a motor fixed to said vertical base plate with the axis thereof parallel to said table, a drive pulley on said motor, an idler pulley, means mounting said idler pulley to said vertical base for swinging movement on a horizontal pivot, means biasing said idler pulley away from said drive pulley, an endless grinding belt trained over said idler and said drive pulleys, and longitudinally movable means on said base for supporting and moving work with respect to said grinding belt.

2. A device as claimed in claim 1 wherein said last named means includes means for transversely adjusting the work toward and away from said grinding belt.

3. A device as claimed in claim 1 wherein said last named means includes means for longitudinally pivotally adjusting the work with respect to said grinding belt.

4. A device as claimed in claim 1 wherein said last named means includes means for vertically adjusting the work with respect to said grinding belt.

References Cited in the file of this patent

UNITED STATES PATENTS

| | | |
|---|---|---|
| 250,665 | Hyde | Dec. 13, 1881 |
| 1,778,132 | Wegner | Oct. 14, 1930 |
| 1,915,247 | Holloway et al. | June 20, 1933 |
| 2,097,068 | Johnson | Oct. 26, 1937 |
| 2,106,082 | Carlson | Jan. 18, 1938 |
| 2,416,493 | Newton | Feb. 25, 1947 |
| 2,722,787 | Hallewell et al. | Nov. 8, 1955 |
| 2,736,994 | Whittum | Mar. 6, 1956 |
| 2,748,539 | Murray | June 5, 1956 |